(12) United States Patent
Zuber et al.

(10) Patent No.: US 8,394,551 B2
(45) Date of Patent: Mar. 12, 2013

(54) MEMBRANE ELECTRODE ASSEMBLY FOR USE IN ELECTROCHEMICAL DEVICES

(75) Inventors: Ralf Zuber, Grossotheim (DE); Sandra Wittpahl, Haszogenaurach (DE); Klaus Schaack, Obernburg (DE); Holger Dziallas, Hanau (DE); Peter Seipel, Alzenau (DE); Günther Vulpius, Riedstadt (DE); Bernd Dillmann, Seeheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 950 days.

(21) Appl. No.: 10/564,794

(22) PCT Filed: Jul. 14, 2004

(86) PCT No.: PCT/EP2004/007794
§ 371 (c)(1),
(2), (4) Date: Dec. 11, 2006

(87) PCT Pub. No.: WO2005/006473
PCT Pub. Date: Jan. 20, 2005

(65) Prior Publication Data
US 2007/0215461 A1      Sep. 20, 2007

Related U.S. Application Data

(63) Continuation-in-part of application No. 10/699,158, filed on Oct. 30, 2003, now abandoned.

(30) Foreign Application Priority Data

Jul. 14, 2003   (DE) .................................. 103 31 836

(51) Int. Cl.
  *H01M 8/00*     (2006.01)
(52) U.S. Cl. ........................ 429/483; 429/484
(58) Field of Classification Search ............ 429/12, 429/30, 34, 36, 38, 483, 484, 492, 496
See application file for complete search history.

(56) References Cited

U.S. PATENT DOCUMENTS

| 4,555,324 A | 11/1985 | Ueno et al. |
| 4,652,502 A | 3/1987 | Breault et al. |

(Continued)

FOREIGN PATENT DOCUMENTS

| EP | 0 951 086 A2 | 10/1999 |
| EP | 0 951 086 A3 | 10/2001 |

(Continued)

OTHER PUBLICATIONS

U.S. Appl. No. 10/564,798, Zuber et al.

(Continued)

*Primary Examiner* — Mark F Huff
*Assistant Examiner* — Monique Wills
(74) *Attorney, Agent, or Firm* — Levin Santalone LLP; John Santalone (57) ABSTRACT

The invention relates to a membrane-electrode assembly (MEA) for electrochemical devices, in particular for membrane fuel cells. The membrane-electrode assembly has a semi-coextensive design and comprises an ion-conducting membrane, two catalyst layers and gas diffusion layers of differing sizes on the front side and rear side. The first gas diffusion layer has smaller planar dimensions than the ion-conducting membrane, while the second gas diffusion layer has essentially the same planar dimensions as the ion-conducting membrane. As a result, the ion-conducting membrane has a surface which is not supported by a gas diffusion layer on the front side.

The membrane-electrode assembly has, owing to the particular construction, a stable structure which can be handled readily and displays advantages in the sealing of the reactive gases from one another and also in terms of the electrical properties. In particular, the hydrogen penetration current is significantly reduced.

New processes for producing the MEA of the invention are described, in particular the method of heat pulse welding.

The membrane-electrode assembly is used in PEM fuel cells, direct methanol fuel cells, electrolysers and other electrochemical devices.

16 Claims, 3 Drawing Sheets

U.S. PATENT DOCUMENTS

| | | | |
|---|---|---|---|
| 4,786,568 A * | 11/1988 | Elmore et al. | 429/508 |
| 5,176,966 A | 1/1993 | Epp et al. | |
| 5,187,025 A | 2/1993 | Kelland et al. | |
| 5,264,299 A | 11/1993 | Krasij et al. | |
| 5,464,700 A | 11/1995 | Steck et al. | |
| 5,858,569 A | 1/1999 | Meacher et al. | |
| 5,861,222 A | 1/1999 | Fischer et al. | |
| 5,945,192 A | 8/1999 | Kato et al. | |
| 6,020,083 A | 2/2000 | Breault et al. | |
| 6,057,054 A | 5/2000 | Barton et al. | |
| 6,159,628 A | 12/2000 | Grasso et al. | |
| 6,197,147 B1 | 3/2001 | Bonsel et al. | |
| 6,245,454 B1 | 6/2001 | Gocho et al. | |
| 6,309,772 B1 | 10/2001 | Zuber et al. | |
| 6,500,217 B1 | 12/2002 | Starz et al. | |
| 6,613,215 B2 | 9/2003 | Molter et al. | |
| 7,267,902 B2 * | 9/2007 | Brunk et al. | 429/481 |
| 2002/0079235 A1 | 6/2002 | Molter et al. | |
| 2003/0049367 A1* | 3/2003 | Biegert et al. | 427/115 |
| 2003/0049518 A1* | 3/2003 | Nanaumi et al. | 429/44 |
| 2003/0057088 A1 | 3/2003 | Ichikawa et al. | |
| 2004/0142228 A1* | 7/2004 | Komura et al. | 429/38 |
| 2005/0014056 A1 | 1/2005 | Zuber et al. | |
| 2005/0263246 A1* | 12/2005 | Yandrasits et al. | 156/307.3 |

FOREIGN PATENT DOCUMENTS

| | | |
|---|---|---|
| EP | 1 289 042 A2 | 3/2003 |
| EP | 1 289 042 A3 | 3/2003 |
| EP | 0 951 086 B | 1/2005 |
| EP | 1 289 042 A3 | 3/2005 |
| JP | 09 063622 A | 3/1997 |
| JP | 09 289028 A | 11/1997 |
| JP | 11 045729 A | 2/1999 |
| WO | WO 02/27845 A2 | 4/2002 |

OTHER PUBLICATIONS

International Search Report for PCT/EP2004/007802 dated Mar. 7, 2006. (2 pages).

International Search Report for PCT/EP2004/007794 dated Sep. 19, 2005. (3 pages).

* cited by examiner

MEMBRANE ELECTRODE ASSEMBLY FOR USE IN ELECTROCHEMICAL DEVICES

CROSS REFERENCE TO RELATED APPLICATIONS

This application is a continuation-in-part application of U.S. Ser. No. 10/699,158, filed 30 Oct. 2003 now abandoned, the entire disclosure of which is hereby incorporated by reference into the present application.

The invention relates to the technical field of electrochemistry and describes a membrane-electrode assembly ("MEA") for electrochemical devices such as fuel cells (membrane fuel cells, PEMFC, DMFC, etc.), electrolysers or electrochemical sensors. Furthermore, a process for producing the membrane-electrode assembly and its use are described.

Fuel cells convert a fuel and an oxidant in separate locations at two electrodes into electric power, heat and water. As fuel, it is possible to use hydrogen or a hydrogen-rich gas, while oxygen or air can serve as oxidant. The energy conversion in the fuel cell has a particularly high efficiency. For this reason, fuel cells in combination with electric motors are becoming increasingly important as alternatives to conventional internal combustion engines.

The polymer electrolyte fuel cell (PEM fuel cell) is particularly suitable for use in electric automobiles because of its compact construction, its power density and its high efficiency.

For the purposes of the present invention, a PEM fuel cell stack is a stack of fuel cell units. A fuel cell unit will hereinafter also be referred to as fuel cell for short. It contains, in each case, a membrane-electrode assembly (MEA) which is arranged between bipolar plates which are also referred to as separator plates and serve for the introduction of gas and conduction of electric current.

A membrane-electrode assembly comprises an ion-conducting membrane which has been provided on both sides with catalyst-containing reaction layers, namely the electrodes. One of the reaction layers is configured as anode for the oxidation of hydrogen and the second reaction layer is configured as cathode for the reduction of oxygen. Gas diffusion layers comprising carbon fibre nonwoven, carbon fibre paper or woven carbon fibre fabric are applied to these catalyst layers. They manage for the reaction gases to get to the electrodes readily and for the cell current to be conducted away well. Anode and cathode contain electrocatalysts which catalyse the respective reaction (oxidation of hydrogen or reduction of oxygen).

As catalytically active components, preference is given to using the metals of the platinum group of the Periodic Table of the Elements. In the majority of cases, use is made of supported catalysts in which the catalytically active platinum group metals have been applied in finely divided form to the surface of a conductive support material. The mean crystallite size of the platinum group metals is in the range from about 1 to 10 nm. Finely divided, conductive carbon blacks have been found to be useful as support materials.

The ion-conducting membrane preferably comprises proton-conducting polymer materials. These materials will hereinafter also be referred to as ionomers for short. Preference is given to using a tetrafluoro-ethylene-fluorovinyl ether copolymer having sulphonic acid groups. This material is, for example, marketed under the trade name Nafion® by DuPont. However, it is also possible to use other, in particular fluorine-free, ionomer materials such as doped sulphonated polyether ketones or doped sulphonated or sulphinated aryl ketones and also doped polybenzimidazoles. Suitable ion-conducting membranes are described by O. Savadogo in "Journal of New Materials for Electrochemical Systems" I, 47-66 (1998). For use in fuel cells, -these membranes generally need to have a thickness of from 10 to 200 μm.

The present invention describes membrane-electrode assemblies (MEAs) having improved properties with respect to power, life and sealing of the gas spaces or gas inlets. The sealing of the gas spaces of the PEM fuel cell from the outside air and from any other reactive gas is essential for the safety and the application of fuel cell technology.

In U.S. Pat. No. 5,407,759, such concepts for phosphoric acid fuel cells (PAFC) have been already described. The cell contains phosphoric acid between a pair of electrodes and a sealing frame composed of a metal oxide and fluoro-rubber. An additional sealing strip is installed between electrode and sealing frame.

Further construction concepts for membrane-electrode assemblies are described in U.S. Pat. No. 3,134,697 and EP 700 108 A2. These concepts are characterized in that the membrane forms a margin which projects beyond the electrodes and is, to seal the cell, clamped between the cell plates and, if necessary, between further seals.

However, membrane-electrode assemblies (MEAs) having a projecting membrane margin are sensitive to mechanical damage to the membrane during production and assembly. Such damage can easily lead to failure of the cell, since the membrane has to separate the gas spaces for the reactive gases hydrogen and oxygen from one another. Damage to a membrane occurs particularly easily when very thin membranes, (i.e. up to a thickness of 25 μm) are used. This leads to problems, particularly in MEA manufacture by a continuous process.

A further method of constructing MEAs is disclosed in U.S. Pat. No. 3,134,697, where the use of precut frames of polymer material are used and are placed all round the electrodes between membrane and bipolar plates.

EP 586 461 B1 proposes various structural geometries for sealed membrane-electrode assemblies, in which the membrane-electrode assembly formed by two gas diffusion layers and a membrane is enclosed with elastic sealing material and compressed. The enclosure of the MEA with subsequent compression can, in the case of damage to or perforation of the membrane, lead to failure of the cell.

Another concept is described in U.S. Pat. No. 5,176,966. The porous, electrically conductive gas diffusion layers comprising carbon fibre paper of the membrane-electrode assembly cover the membrane completely, i.e., the membrane and the gas diffusion layers have the same dimensions and are "coextensive". Sealing is effected by impregnation of the carbon fibre paper with a sealing material around the electrochemically active area and around the openings for fluid transport.

DE 197 03 214 describes a membrane-electrode assembly which likewise has a coextensive design and in which the membrane is covered essentially completely on both surfaces by the electrodes or gas diffusion layers. An integrated sealing edge is provided around the outside of the membrane-electrode assembly which penetrates through the edge region of at least one electrode. The sealing material is, except on the end face, not in contact with a free membrane surface.

In the case of construction concepts based on the coextensive design (i.e. in which essentially the entire membrane surface is covered and supported by gas diffusion layers or electrodes), the edges of the poles of the fuel cell (i.e. anode and cathode) are separated from one another by only a few microns (generally less than 100 μm). When the MEAs are cut or separated into individual units and during subsequent processing steps, there is a risk of the electrodes being short-circuited (for example by fibres from the gas diffusion layers). This means that short circuits and failure can frequently occur in the manufacture of MEAs having the coextensive design.

A further problem in the coextensive design is the gastight separation of the reactive gases oxygen (or air) and hydrogen from one another. Sealing would require perfect impregnation of the peripheral edge region of the gas diffusion layer. However, this impregnation has to go through to the membrane located under the gas diffusion layer in order to prevent hydrogen from creeping through to the outer edge of the gas diffusion layer. However, this is not really possible because of the fine pores in the gas diffusion layers and catalyst layers. There is no direct contact between the sealing material and a free area of the ion-conducting membrane. Increased penetration of hydrogen to the cathode of the membrane-electrode assembly can therefore occur in the case of the coextensive design, which results in a reduction of the open cell voltage (OCV) and, associated therewith, in a reduced electric power of the MEA.

It was therefore an object of the present invention to provide a membrane-electrode assembly which overcomes the disadvantages of the prior art and, in particular, has an improved construction concept.

This object is achieved by the membrane-electrode assembly set forth in Claim 1. Advantageous embodiments of the membrane-electrode assembly are described in the subsequent claims. Further claims are directed to processes for producing the assembly, sealing or impregnating it and to the use of the membrane-electrode assembly of the invention in electrochemical devices.

The membrane-electrode assembly of the invention comprises an ion-conducting membrane which has a catalyst layer on the front side and the rear side and these layers are in turn each joined to a gas diffusion layer, with the first gas diffusion layer having smaller planar dimensions than the ion-conducting membrane and the second gas diffusion layer essentially coinciding with the membrane. The structures according to the invention of the membrane-electrode assembly are shown schematically as cross-section in FIGS. 1 to 5.

Figure 1:
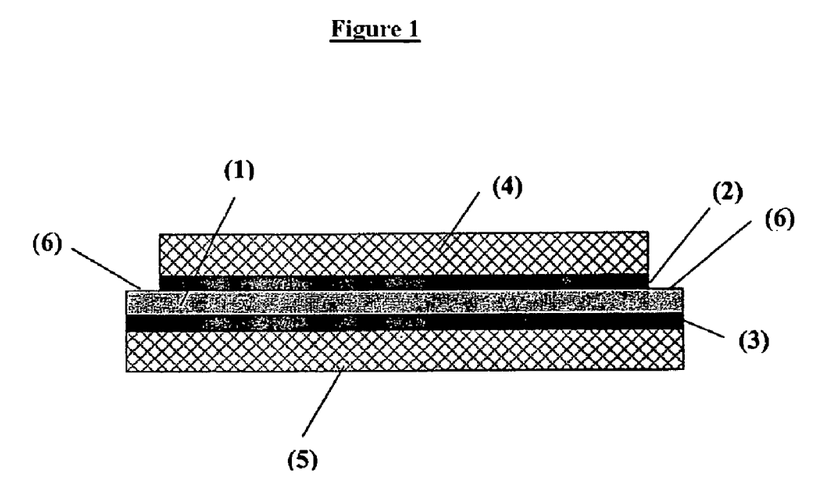

FIG. 1 shows a preferred embodiment of the membrane-electrode assembly of the invention having a "semi-coextensive" design. In the figure, (1) denotes the ion-conducting membrane which is in contact with the catalyst layers (2) and (3) on its front side and rear side. The planar dimensions of the first gas diffusion layer (4) are smaller than that of the membrane (1), so that the front side of the membrane (1) has a surface (6) which is not supported by the gas diffusion layer (4). The underside of the membrane (1) is in contact over its entire area with the catalyst layer (3) and is supported over its entire area by the gas diffusion layer (5). The smaller gas diffusion layer is located centrally on the membrane. The distance from the outer edge of the smaller first gas diffusion layer (4) to the outer edge of the larger second gas diffusion layer (5) in the finished membrane-electrode assembly is at least 0.5 mm around the circumference, preferably at least 1 mm. The catalyst layers (2) and (3) have different planar dimensions, i.e. they are not the same size.

Figure 2:
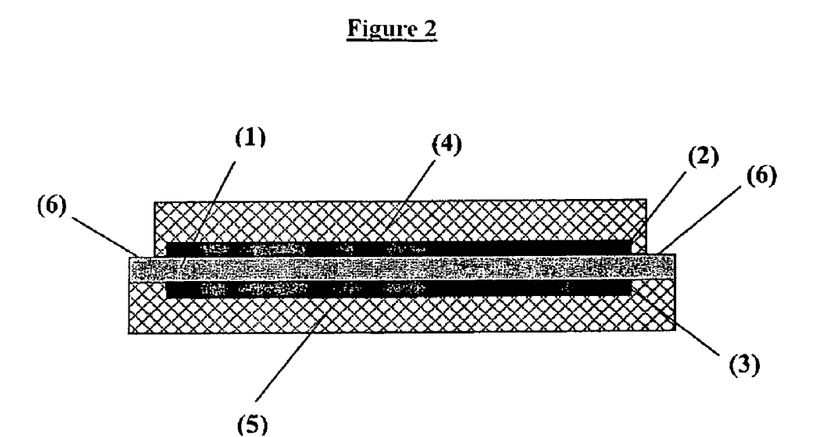

FIG. 2 shows a second preferred embodiment of an MEA according to the invention having a semi-coextensive design. The structure is essentially comparable with FIG. 1, but the catalyst layers (2) and (3) have the same planar dimensions. The area of the first gas diffusion layer (4) is smaller than that of the membrane (1), so that the membrane (1) once again has a surface (6) on its front side which is not supported by the gas diffusion layer (4). In this embodiment, the catalyst layers (2) and (3) have a smaller area than the ion-conducting membrane. However, in an alternative embodiment, the catalyst layers (2) and (3) can have the same planar dimensions as the ion-conducting membrane (1).

Figure 3:
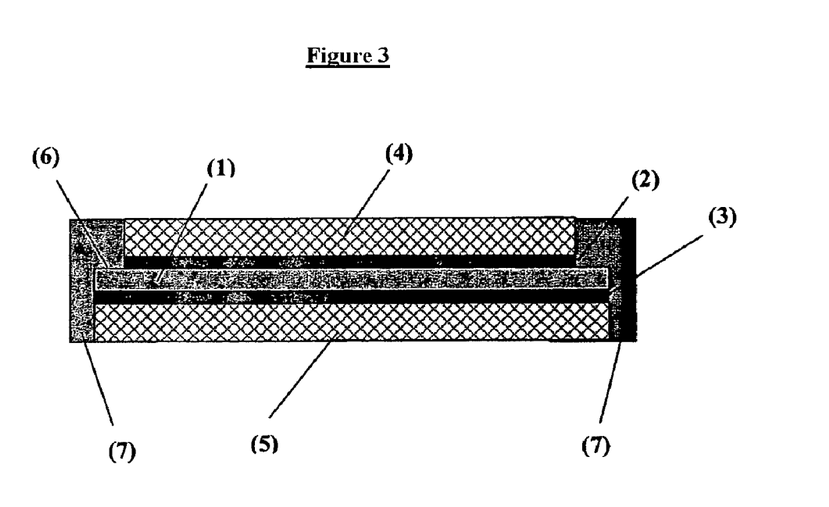

FIG. 3 likewise shows, in section, the sealing of the membrane-electrode assembly of the invention with a suitable sealing material (7). Here, the edge of the gas diffusion layers (4, 5) and the surface (6) of the ion-conducting membrane (1) which is not supported by a gas diffusion layer is enclosed by a sealing material (7). The sealing material (7) can be mechanically reinforced by incorporated pulverulent or fibrous materials.

Figure 4:
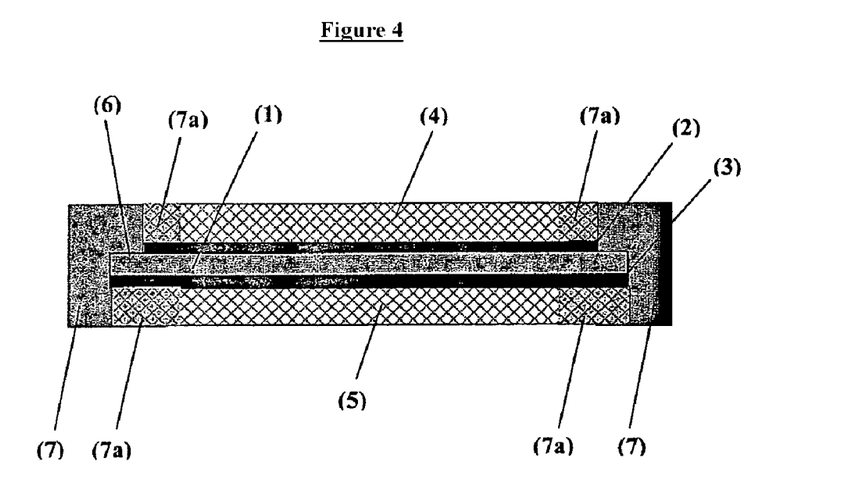

Furthermore, as shown in FIG. 4, the sealing material can impregnate the edge region of the gas diffusion layers (4, 5) to a width of at least 0.5 mm, preferably from 3 to 10 mm. These additionally impregnated regions of the gas diffusion layers (4, 5) are denoted by (7a) in this figure.

Figure 5:
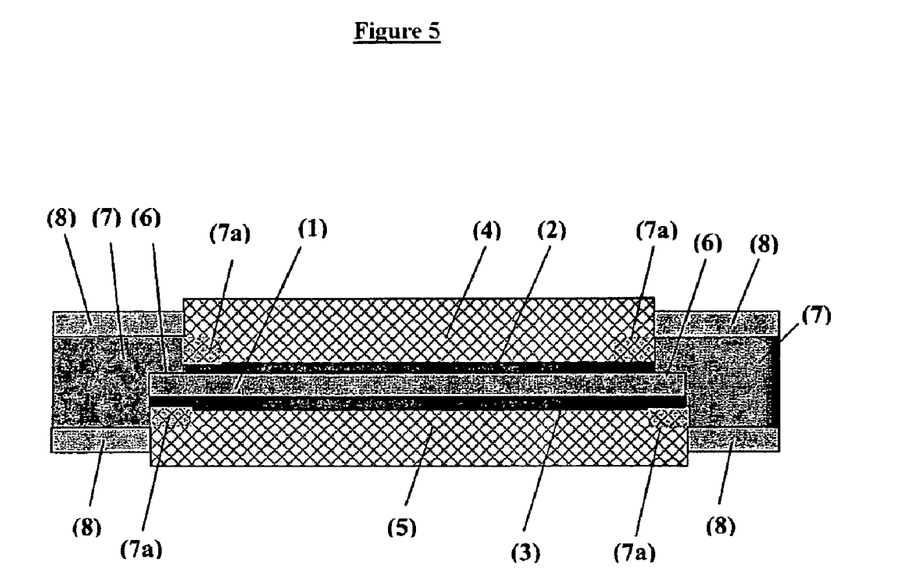

FIG. 5 shows a further embodiment of an MEA according to the invention which has a multilayer frame of sealing material. The frame preferably comprises two layers of creep-resistant sealing material (8) which are applied to the front side and the rear side, respectively, of the MEA. These layers of creep-resistant sealing material (8) are adjoined by means of a layer of a further sealing material (7) both to one another and at the same time to the overall MEA. The thickness of the total frame is designed so that the gas diffusion layers (4, 5) of the MEA are optimally compressed in an assembled PEM cell. Further layers of sealing material are possible.

An important feature of the membrane-electrode assembly of the invention having a semi-coextensive design is the presence of a free membrane surface (6) which is not supported or covered by a gas diffusion layer. It has surprisingly been found that, as a result of this feature, a significantly better gas-impermeability of the sealing of the edge region of the membrane-electrode assembly is achieved. This is of great importance particularly because "hot spots" at which hydrogen is burnt catalytically can occur in the case of increased penetration of hydrogen to the oxygen side of the fuel cell. This can lead to failure of the cell after only a short period of use. However, such effects can occur in particular on prolonged operation of the MEA in the PEM fuel cell stack and considerably shorten the life of the stack. An indication of increased penetration of hydrogen to the oxygen side of the fuel cell is a reduction in the open cell voltage without electric current ("OCV") to a value below 920 mV. The penetration of hydrogen can also be measured as penetration current with the aid of cyclic voltametry. Values for the penetration current density of greater than 1.5 mA/cm$^2$ indicate leakage. The measurement methods indicated are used in the present patent application to demonstrate the improved properties of the membrane-electrode assembly having a semi-coextensive design.

A further advantage of the MEA of the invention is that, owing to the construction described, it has a stable structure which can readily be handled. The two poles or electrodes of the membrane-electrode assembly are, as a result of the construction according to the invention, separated physically from one another to a greater degree in the edge region. The risk of short circuits is significantly reduced. During cutting or separation of the MEAs into individual units and during other subsequent processing steps, there is no risk of the poles being short-circuited, for example by fibres from the gas diffusion layers.

The membrane-electrode assemblies of the invention can be produced using all customary processes which are known for this purpose to those skilled in the art. One way involves, for example, the joining or lamination of two catalyst-coated gas diffusion layers on the front side and rear side of the ion-conducting membrane. The gas diffusion layers concerned, which have different planar dimensions, are coated with catalyst-containing inks and dried. The catalyst layers produced in this way comprise, depending on the composition of the inks, catalysts containing precious metals and, if appropriate, ion-conducting materials and further additives such as pore formers or PTFE. Suitable inks are described in EP 1 176 452. These are then pressed together with a membrane using heat and pressure, with the planar dimensions of the membrane correspond to that of the larger gas diffusion layer. The gas diffusion layers (GDLs) can comprise porous, electrically conductive materials such as carbon fibre paper, carbon fibre nonwoven, woven carbon fibre fabrics, metal meshes, metallized woven fibre materials and the like ("process via catalyst-coated gas diffusion layers").

As an alternative, it is also possible to use catalyst-coated membranes (CCMs). The gas diffusion layers, which are generally not coated with catalyst, are then applied in a further joining step directly onto the catalyst layers which have been applied to the membrane. Here too, it is important that one of the two gas diffusion layers essentially is coinciding with the membrane and the second gas diffusion layer is smaller than the membrane ("process via catalyst-coated membranes").

Of course, mixed forms and combinations of these two processes are also possible for producing the MEAs of the invention.

The ion-conducting membrane generally comprises proton-conducting polymer materials. Preference is given to using tetrafluoroethylene-fluorovinyl ether copolymer having sulphonic acid groups. This material is marketed, for example, under the trade name Nafion® by DuPont. However, it is also possible to use other, in particular fluorine-free, ionomer materials such as doped sulphonated polyether ketones or doped sulphonated or sulphinated aryl ketones and also doped polybenzimidazoles.

The membrane-electrode assemblies of the invention can be sealed or framed using organic polymers which are inert under the operating conditions of the fuel cell and do not release interfering substances. The polymers have to be able to enclose the gas diffusion layers in a gastight manner. Further important requirements which such polymers have to meet are good adhesion and good wetting properties towards the free surface of the ion-conducting membrane.

Suitable materials are, firstly, thermoplastic polymers such as polyethylene, polypropylene, PTFE, PVDF, polyamide, polyimide, polyurethane or polyester; secondly, thermoset polymers such as epoxy resins or cyanoacrylates. Also suitable are elastomers such as silicone rubber, EPDM, fluoroelastomers, perfluoroelastomers, chloroprene elastomers, fluorosilicone elastomers.

To apply the polymeric sealing material, the polymer can be used either in the form of a precut frame of film or as a liquid or as moulding composition.

A further important property of the polymeric sealing material is the strength, in particular the creep strength under a mechanical load. The membrane-electrode assemblies are mechanically compressed in the fuel cell stack. It is important here to set a defined compression of the MEAs. This is usually achieved by setting a defined compressing force which is set so that the MEA is compressed to a particular thickness characteristic for optimal performance of the cell. Here, an optimum balance between the reduction in the electrical contact resistance and the thickness and porosity of the gas diffusion structures of the MEA required for reactive gas transport is set.

If the creep strength is insufficient, the edge region of the MEA comprising the polymer frame and possibly also inactive polymer electrolyte membrane is irreversibly deformed. In this case, the gap between the cell plates and thus also the space for the MEA becomes smaller and the compression of the MEA increases with increasing time of operation. This applies particularly to polymers having a low glass transition temperature ($T_g$) which is in the working range of the PEM fuel cell of from 50 to 100° C. The continuing compression of the MEA beyond the ideal point leads to a decrease in the power and also later to failure of the cell because of perforation of the membrane by the carbon fibres of the gas diffusion structures.

In a further embodiment of the invention (the so-called "multilayer" structure, cf. FIG. 5), polymers having a high glass transition temperature ($T_g$), a high melting point and a high heat distortion resistance are used for constructing the polymer frame. Owing to the high glass transition temperatures or melting points, processing of the polymers in a temperature window customary for PEM fuel cell components, e.g. ionomer membranes, is not possible.

For this reason, the frame materials are joined to one another and to the structure of the MEA by means of a polymeric adhesive. The adhesive is introduced as an intermediate layer between two frame materials and bonds on the step of the free membrane. In addition, it flows on application of the frame under the action of heat and pressure into the structures of the gas diffusion layers and catalyst layers and thus connects the polymer frame and the MEA to one another. The thickness of the adhesive layer should be from 10 to 60 μm, preferably 30 μm.

As particularly creep-resistant materials, use is made of polymers having a high glass transition temperature ($T_g$) above 100° C., preferably above 120° C. and having a high heat distortion resistance in the working temperature range of the PEM fuel cell. Examples of such materials are high-melting polyesters, poly-phenylene sulphides and polyamides, etc.

As adhesives, it is possible to use cold curing adhesives and hot curing adhesives such as acrylates, cyanoacrylates, epoxy resins, EVA, polyethylene and polypropylene, etc.

To aid the manufacture of frames according to the invention, the adhesive layers should be applied beforehand to the frames. The two prefabricated frames with adhesive layers can then be adhesively bonded to one another. The membrane-electrode assembly is subsequently laid in the opening in the frame and the packet is joined under heat and pressure.

When precut films are used for sealing the membrane-electrode assembly of the invention, the MEA can be laid between two appropriately precut frames of thermoplastic material in a press. The frames are cut so that their internal cutout corresponds as accurately as possible to the shape of the respective active surface. The polymeric film material is then melted under the action of heat and pressure. It then encloses the outer region of the semi-coextensive gas diffusion layers and the free surface area of the membrane in an adhesive bond.

In a further embodiment of the invention, fillers are incorporated into the polymeric frame material to increase the creep strength of the frame. Possible fillers are chemically inert and electrically insulating inorganic materials such as glass fibres or glass spheres. The materials are introduced into the polymeric frame material by compounding before production of the sealing frames. Typical contents of reinforcing materials are in the range from 10 to 30% by weight. The filler-reinforced polymers are processed to foils by conventional film production processes and cut into frames. The frames can be joined by means of heat and pressure to the MEA structures according to the invention.

When polymeric sealing materials are used in liquid form or as a moulding composition, the polymer is firstly applied to the edge region of the membrane-electrode assembly using customary application techniques such as doctor blading, spraying, dipping, injection moulding and various printing techniques. Shaping and curing of the polymer are subsequently carried out. Here, it is also possible to form particular structures to match the design of the cell plates of the fuel cell stack. Curing of the polymeric sealing material can, depending on the type and nature of the polymer, take place as a result of contact with atmospheric moisture and/or at elevated temperature.

The gas diffusion layers of the MEA of the invention can also be impregnated with polymer material to make them gastight in their peripheral region. For this purpose, frames of thermoplastic polymer can be cut so that their inner cutout is somewhat smaller than the area of the smaller gas diffusion layer of the membrane-electrode assembly. The polymer material is then melted under the action of heat and pressure. It then impregnates the peripheral region of the two semi-coextensive gas diffusion layers right through to the membrane and encloses the open surface of the membrane and the gas diffusion layers in an adhesive bond.

The same result can be achieved by use of polymeric sealing materials in liquid form. The penetration width and penetration depth of the sealing material in the edge region of the MEA can be controlled by means of its viscosity and wetting properties. Curing of the polymeric sealing material can, depending on the type of polymer, take place as a result of contact with atmospheric moisture and/or at elevated temperature.

A method of producing a firm bond between the membrane-electrode assembly of the invention and a frame of polymeric sealing material is likewise subject matter of the present invention. The method is characterized in that the MEA is brought into contact with one or more prefabricated frames of polymeric sealing material and the regions of the MEA and the polymer sealing frame which are in direct contact with one another are welded together under pressure by means of a brief electrical heating pulse. The process is also referred to as "heat pulse welding".

The advantage of heat pulse welding over conventional pressing and lamination is the rapid cycle time. The tooling costs are also significantly lower than in the case of injection moulding, so that heat pulse welding can react more flexibly to altered geometries. In heat pulse welding, the welding zone is heated right through the material by means of electrically heated heating strips; as a result, a high temperature is achieved in the material to be welded within a short time. Owing to the low mass and thus low heat capacity of the heating strips, the overall system cools to below the solidification temperature of the film very quickly after the current is switched off and the welded product can be taken out. As a result, welding and cooling times are more than one order of magnitude below the processing times when hot presses are used.

The duration of the heating phases is in the region of a few seconds and the specimen is cooled under pressure. A welding tool with the electrically heatable strips is configured so that the strips are arranged in only the direct contact zones of the MEA structure and polymeric frame material and, if necessary, the polymeric frame material itself are subjected to thermal stress. Customary process parameters are temperatures in the range from 100 to 220° C., pressures in the range from 1 to 10 bar and heating times of from 1 to 20 seconds. The cooling times are from 20 to 60 seconds.

A further possible design involves bonding of a precut outer frame to the MEA of the invention by means of a liquid polymeric sealing material. It is in this case also possible to use heat reactivateable sealing materials and display, after a first curing step, adhesive action on further temperature increase and then finally cure. In this step, the prefabricated outer margin can at the same time be adhesively bonded on. The finished membrane-electrode assemblies produced in this way are one-piece composites which have good mechanical handling properties and can be built into a fuel cell stack in a simple process.

The following examples illustrate the invention.

EXAMPLE 1

Production of a Membrane-electrode Assembly According to the Invention Having a Semi-coextensive Design (Single-layer Margin)

Two catalyst-coated gas diffusion layers having a platinum loading of 0.25 mg of Pt/cm$^2$ in each case are firstly produced. SIGRACET 30BC carbon fibre nonwovens (hydrophobicized, with compensating layer; from SGL, Meitingen) are used for this purpose. The following pieces are cut:
a) gas diffusion layer A having dimensions of 73×73 mm and
b) gas diffusion layer B having dimensions of 75×75 mm and
c) Nafion® 112 membrane (from DuPont Fluoroproducts, Fayetteville USA) having dimensions of 75×75 mm.

The gas diffusion layers A and B are positioned on the catalyst-coated sides of the membrane. The smaller gas diffusion layer A is centred on the membrane. The structure is subsequently pressed at 150° C. and a pressure of 150 N/cm$^2$. The finished membrane-electrode assembly has a semicoextensive design with a margin of free membrane of 1 mm.

To seal the MEA produced in this way, the following frames are cut from a polyamide film (Vestamelt 3261, from Epurex, Walsrode) having a thickness of 0.21 mm:
a) external dimensions of 100×100 mm and internal dimensions of 71×71 mm and
b) external dimensions of 100×100 mm and internal dimensions of 75×75 mm.

The membrane-electrode assembly is placed centrally with the gas diffusion layer B downward on a frame (thickness: 0.210 mm) having internal dimensions of 71×71 mm. A further frame (total thickness: 0.210 mm) having internal dimensions of 75×75 mm is positioned to enclose the membrane-electrode assembly on the outside. A frame (thickness: 0.210 mm) having internal dimensions of 71×71 mm is likewise placed centrally on the surface of the smaller gas diffusion layer A.

The total structure is packed between two release films and heated without the application of pressure in a hot press at a platen temperature of 165° C. for 90 seconds. The force of the press is then increased to 10 tons and the structure is pressed at this force for 30 seconds. It is subsequently cooled to room temperature. The finished membrane-electrode assembly having a semi-coextensive design has a smooth, transparent plastic margin which displays very good adhesion to the MEA.

COMPARATIVE EXAMPLE 1 (CE 1)

The production of a membrane-electrode assembly having a coextensive design is carried out in principle as described in Example 1. However, the two gas diffusion layers (A, B) and the membrane have the same planar dimensions of 73×73 mm. The MEA has no circumferential margin of free membrane.

The sealing of the MEA is carried out as described in Example 1 using the same polyamide film and the same process parameters. The MEA has a smooth, transparent polymer margin which has a lower adhesion to the MEA compared to Example 1.

EXAMPLE 2

Production of a Membrane-electrode Assembly According to the Invention Having a Semi-coextensive Design (Multilayer Margin)

A membrane-electrode assembly according to the invention having a semi-coextensive design is provided as described in Example 1. The dimensions of the semicoextensive MEA are 71 mm×71 mm (smaller electrode) and 75 mm×75 mm (larger electrode) and membrane. The thickness of the MEA is 650-700 µm.

The following are likewise provided:
a) a frame made of Hostaphan RN (from Mitsubishi Films, thickness: 250 µm, PET, softening point: >250° C.) and having external dimensions of 110 mm×110 mm and internal dimensions of 71.5 mm×71.5 mm and
b) a frame made of Hostaphan RN (from Mitsubishi Films, 250 µm thick, PET, softening point: >250° C.) and having external dimensions of 110 mm×110 mm and internal dimensions of 75.5 mm×75.5 mm and also
c) a frame made of Macromelt Q 5375-22 (from Henkel, polyolefinic hotmelt adhesive, softening point: about 140° C., thickness: 60 µm; on silicone paper carrier) and having external dimensions of 110 mm×110 mm and internal dimensions of 71.5 mm×71.5 mm.

The Macromelt frame is applied with the adhesive side to the larger of the two Hostaphan frames so that the two frames are coinciding. The silicone paper is pulled off so that the adhesive adheres to the Hostaphan. The second Hostaphan frame is subsequently applied to the adhesive layer. The resulting three-layer frame then consists of two Hostaphan layers joined by a Macromelt layer. The three-layer frame structure is then pressed at 130° C. and 100 N/cm$^2$ in a hot press for 30 seconds to improve adhesion. The total thickness is then 530 µm. The semicoextensive MEA provided before is laid into the opening of the frame so that the smaller frame cutout surrounds the smaller electrode and the larger frame cutout surrounds the larger electrode.

The packet formed in this way is subsequently pressed at T=150° C. and p=200 N/cm$^2$ in a hot press for 15 seconds. It is subsequently cooled to room temperature. The finished membrane-electrode assembly having a semi-coextensive design has a smooth, transparent multilayer polymer margin which displays very good adhesion to the MEA. The electrochemical properties are summarized in Table 1.

EXAMPLE 3

Production of a Membrane-electrode Assembly According to the Invention Having a Semi-coextensive Design Using Heat Pulse Welding A semi-coextensive MEA is firstly provided as described in Example 1. To seal the MEA produced in this way, frames having
external dimensions of 100×100 mm and internal dimensions of 73.5×73.5 mm and
external dimensions of 100×100 mm and internal dimensions of 75.5×75.5 mm are cut from a polyamide film (Vestamelt 3261, from Epurex, Walsrode) having a thickness of 0.30 mm.

A pulse welding tool having a rectangular shape (102 mm×102 mm, 15.5 mm weld width, from Schirrmacher, Trittau) was installed in a pneumatic welding press. It was operated using a pulse generator for the operation of pulse welding machines. The 15.5 mm wide heating strips are installed so that they run parallel at a distance from the outer edges of 100 mm.

The semi-coextensive MEA provided is laid into the opening of the two frames so that the smaller frame cutout surrounds the smaller electrode and the larger frame cutout surrounds the larger electrode. The packet prepared in this way is laid in the welding press so that the welding strips completely cover the two parallel frame regions.

Welding is then carried out at a temperature of 165° C. and a pressure of 3.5 bar for a heating time of 5 seconds. After the heating pulse, the press remains closed for 60 seconds to ensure complete cooling of the specimen. This specimen is then taken from the welding press and laid at right angles to the previously welded strip. Welding in the transverse direction is then carried out as described above.

The finished membrane-electrode assembly having a semi-coextensive design has a transparent polymer margin which displays very good adhesion to the MEA.

EXAMPLE 4

Production of a Membrane-electrode Assembly According to the Invention Having a Semi-coextensive Design (Use of Sealing Materials Containing Fillers)

Pelletized Vestamelt 3261 (Degussa, Dusseldorf) and glass sphere material of the 5000 cpo 3 type (from Potters-Ballotini, Suffolk England; diameter: 60-80 µm) are provided. A mixture of 20 wt.-% of glass sphere material and 80 wt.-% of Vestamelt 3261 are intimately mixed in a kneader (laboratory kneader; kneading chamber: 30 g/50 g; manufacturer: Brabender, model: PL 2000/3) at 180° C. The compound obtained in this way is then pressed at 180° C. to give films having a thickness of 300 µm. The finished films are cut to produce frames.

The further processing to produce an MEA having a polymer sealing frame is then carried out as described in Example 3. The finished membrane-electrode assembly having a semi-coextensive design has a mechanically very creep-resistant, stable polymer margin which displays very good adhesion to the MEA.

Electrochemical Tests

The finished, sealed membrane-electrode assemblies from Example 1, Example 2 and Comparative Example 1 (CE 1) are tested in a PEM test cell having an active cell area of 50 cm$^2$ in hydrogen/air operation. The open cell voltage without electric current ("OCV") is measured first. The amount of hydrogen which passes from the anode side to the cathode side ("hydrogen penetration current") is then determined by means of cyclic voltametry (CV). Table 1 compares the measured values. It is clear that the membrane-electrode assemblies according to the invention have better sealing of the gas spaces from one another than does the MEA having a coextensive design (Comparative Example CE 1).

TABLE 1

Comparison of the open cell voltage (OCV) and the hydrogen penetration current of membrane-electrode assemblies having a coextensive and semi-coextensive design.

| | Design | Open cell voltage [OCV, mV] | Hydrogen penetration current [mA/cm$^2$] |
|---|---|---|---|
| Comparative Example (CE1) | Coextensive | 890 | >4 |
| Example 1 | Semi-coextensive, 1-layer | 950 | 0.89 |
| Example 2 | Semi-coextensive, 2-layer | 963 | n.d. |

The invention claimed is:

1. Membrane-electrode assembly for electrochemical devices, comprising
an ion-conducting membrane having a front side and rear side,
a first catalyst layer and a first gas diffusion layer on the front side and
a second catalyst layer and a second gas diffusion layer on the rear side,
wherein the first gas diffusion layer has smaller planar dimensions than the ion-conducting membrane and the second gas diffusion layer has essentially the same planar dimensions as the ion-conducting membrane;
wherein the ion-conducting membrane has a surface that is not supported by the gas diffusion layer on the front side;
wherein peripheral edges of the gas diffusion layers, peripheral edges of the ion-conducting membrane, and the surface of the ion-conducting membrane that is not supported by the gas diffusion layer on the front side are enclosed by a sealing material which comprises a thermoplastic polymer and is reinforced by an electrically insulating inorganic material comprising glass fibers or glass spheres and which is incorporated into the sealing material as a filler during compounding in the range from 10 to 30 weight %.

2. Membrane-electrode assembly according to claim 1, wherein the catalyst layer on the front side and the catalyst layer on the rear side of the ion-conducting membrane have different planar dimensions.

3. Membrane-electrode assembly according to claim 1, wherein the catalyst layer on the front side and the catalyst layer on the rear side of the ion-conducting membrane have the same planar dimensions.

4. Membrane-electrode assembly according to claim 1, wherein the catalyst layers on the front side and on the rear side each comprises one or more catalysts containing a precious metal.

5. Membrane-electrode assembly according to claim 1, wherein the ion-conducting membrane has a thickness in the range of 10 to 200 µm and comprises an organic polymer selected from the group consisting of proton conducting perfluorinated polymeric sulphonic acid compounds, doped polybenzimidazoles, polyether ketones, polysulphones and ion-conducting ceramic materials.

6. Membrane-electrode assembly according to claim 1, wherein each of the gas diffusion layers independently comprises a porous, electrically conductive material selected from the group consisting of carbon fibre paper, carbon fibre nonwovens, woven carbon fibre fabrics, metal meshes, and metallized woven fabrics.

7. Membrane-electrode assembly according to claim 1, wherein the sealing material additionally impregnates the edge region of the gas diffusion layers to a width of at least 0.5 mm.

8. Membrane-electrode assembly according to claim 1, wherein the thermoplastic polymer is selected from the group consisting of polyethylenes, polypropylenes, polytetrafluoroethylenes, PVDF, polyesters, polyamides, polyamide elastomers, polyimides and polyurethanes.

9. Membrane-electrode assembly according to claim 1, wherein the sealing material is integrally joined to a further circumferential polymer frame.

10. Membrane-electrode assembly according to claim 1, wherein the sealing material comprises a plurality of layers of creep-resistant polymer materials which are joined both to one another and simultaneously to the membrane-electrode assembly by means of a layer of adhesive.

11. Membrane-electrode assembly according to claim 10, wherein the creep resistant materials are polymers having a glass transition temperature (Tg) above 100° C.

12. Membrane-electrode assembly according to claim 10, wherein the adhesive is a cold curing adhesive or a hot-curing adhesive selected from the group consisting of acrylates, cyanoacrylates, epoxy resins, EVA, polyethylene, and propylene.

13. Process for producing a membrane-electrode assembly according to claim 1, wherein the membrane-electrode assembly is brought into contact with one or more prefabricated frames of sealing material and the regions of the membrane-electrode assembly and sealing material which are in direct contact are joined under pressure by means of an electric heating pulse.

14. Process for producing a membrane-electrode assembly according to claim 1, wherein curing of the sealing material is effected by means of increased pressure and/or elevated temperature or by contact with atmospheric moisture and/or by means of elevated temperature.

15. Process for producing a membrane-electrode assembly according to claim 9, wherein the integrally joining of the sealing material to the circumferential polymer frame is effected by means of heat-reactivateable polymers and curing takes place at an elevated temperature.

16. Membrane-electrode assembly according to claim 1, wherein the electrically insulating inorganic material is chemically inert.

* * * * *